United States Patent

[11] 3,632,876

[72] Inventor Stephen M. Bench
Rolling Meadows, Ill.
[21] Appl. No. 866,955
[22] Filed Oct. 16, 1969
[45] Patented Jan. 4, 1972
[73] Assignee Motorola, Inc.
Franklin Park, Ill.

[54] BINARY TO PULSE WAVEFORM CONVERTER
12 Claims, 3 Drawing Figs.

[52] U.S. Cl. 178/68, 178/67, 340/347 DD
[51] Int. Cl. H04l 15/00
[50] Field of Search 340/347, 349, 345; 235/154, 92; 178/66, 67, 68; 325/38, 141, 142, 143

[56] References Cited
UNITED STATES PATENTS
3,251,051 5/1966 Harries et al. 178/68 X
3,461,237 8/1969 Salter 340/347 X
OTHER REFERENCES
R. C. Franchini & D. L. McDougall, Data Encoding Circuit from: IBM Technical Disclosoure Bulletin, Vol. II, No. 5, October, 1968, pages 470–471.

*Primary Examiner*—Maynard R. Wilbur
*Assistant Examiner*—Charles D. Miller
*Attorney*—Mueller and Aichele

ABSTRACT: A sequence of binary data bits are transformed into a waveform consisting of a series of half-cycles of square waves of two different frequencies, the half-cycles being of alternating phase and each frequency corresponding to one of the two binary conditions. This sequence of half-cycle square waves then may be transmitted as a stream of exact half-cycles of audio tones.

Inventor
STEPHEN M. BENCH
BY Mueller, Aichele & Rauner
ATTYS.

Inventor
STEPHEN M. BENCH
BY Mueller, Aichele & Rauner
ATTYS.

BINARY TO PULSE WAVEFORM CONVERTER

BACKGROUND OF THE INVENTION

Data transmission systems have been employed for the transmission of serialized binary digital data over voice bandwidth channels on conventional wire lines or other transmission media. One means by which the necessary conversion of the digital data into a form which may be transmitted over the voice band channel is to employ frequency shift keying (FSK) in response to the digital data for generating a first given frequency in response to binary information of one type and a second given frequency in response to binary information of the other type. A keyed oscillator generally is employed in this type of system, and the system requires several cycles of each frequency to be transmitted in order that the information may be detected and decoded at the receiver. A problem arises in the use of FSK due to the fact that although the phase of the frequency shift keyed to the output is continuous in either of the two frequencies, the changes from one binary state to the other binary state of the input data may occur at any phase. As a result, the binary input data and the frequency modulation output are asynchronous, resulting in the transmission of some ambiguous data by the system.

Other systems have been developed for the synchronous frequency modulation of digital data using equal time intervals for the mark and space information and transmitting the binary information as frequency modulated pulses varying between upper and lower frequencies equal to, respectively, the clock pulse rate and one-half the clock pulse rate of the original digital waveform. These harmonically related signals, transmitted in the form of full cycles and half-cycles then may be filtered to provide a substantially sinusoidal frequency-modulated waveform representative of the original data. Systems of this type require a harmonic relationship between the frequency modulated pulses representing the two different binary conditions of the input data; and the frequency of the modulated pulses is subject to shifting as the bit rate of the input data varies.

SUMMARY OF THE INVENTION

Accordingly it is an object of this invention to provide an improved system for converting digital data to a frequency modulated waveform.

It is another object of this invention to convert a data stream of binary data bits into a stream of exact half-cycles of audio tones.

It is a further object of this invention to provide a system for converting digital data into pulse width modulated data of a variable bit rate.

In accordance with a preferred embodiment of the invention a source of binary data bits is provided with a first output for data bits of one binary condition and a second output for data bits of the other binary condition. These two outputs are applied to first and second gating means for selectively enabling the gating means in accordance with the binary output condition. A binary counter is provided with a source of clock pulses and has outputs corresponding to different counts coupled to each of the two gating means, so that an output pulse is obtained from an enabled gating means whenever the count corresponding to that gating means is attained by the counter. This output pulse then is utilized to shift the next binary data bit into position to enable the corresponding gating means and to reset the counter. At the same time, the phase of the output signal is changed. The cycle of operation then is repeated, and the output signal is a sequence of half-cycle square wave signals of two different frequencies determined by the different outputs of the counter coupled to the first and second gating means.

DETAILED DESCRIPTION

Figure 1:
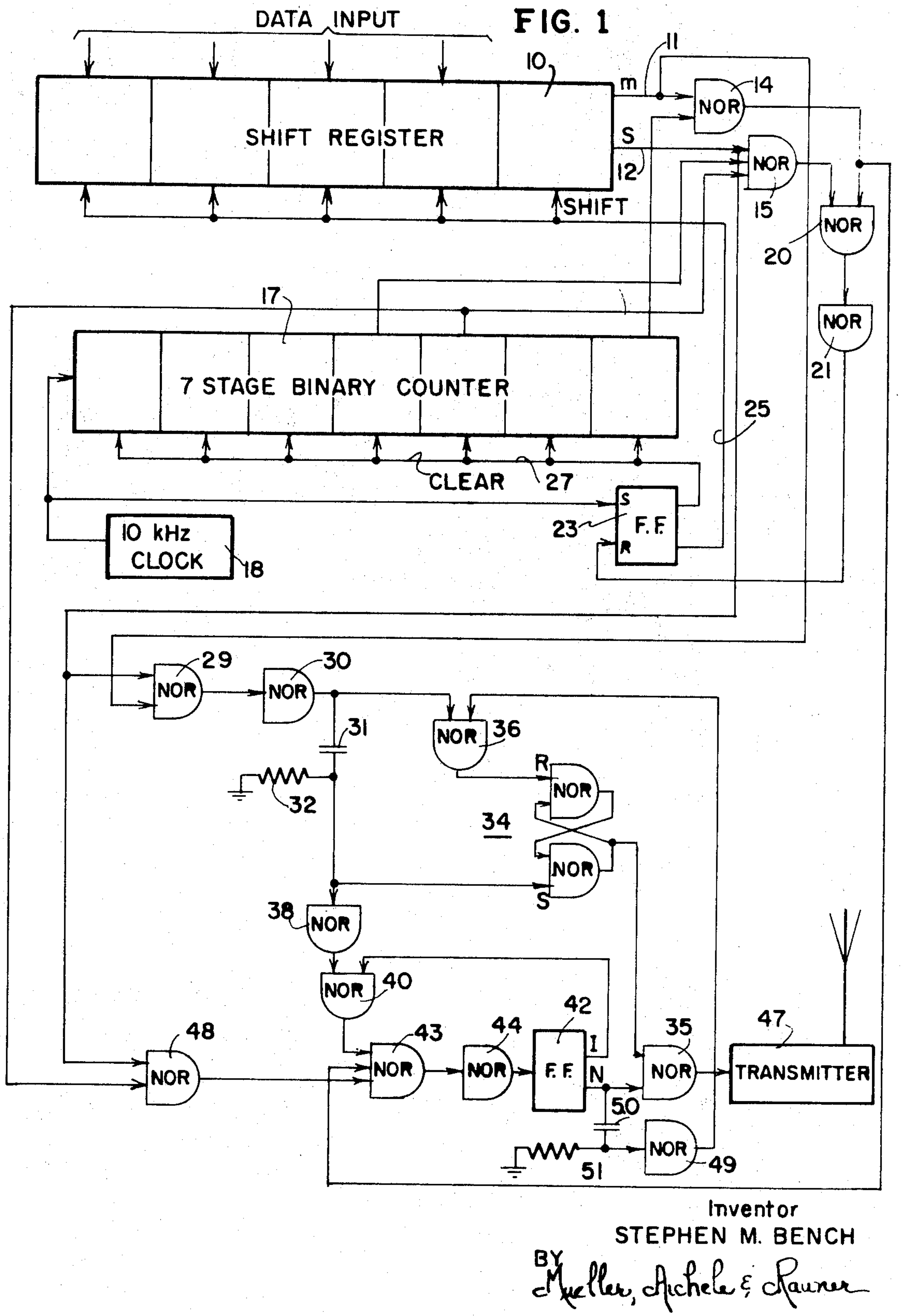
FIG. 1 is a block diagram of a preferred embodiment of the invention.

Referring now to FIG. 1, there is shown a block diagram of the data conversion system in accordance with a preferred embodiment of the invention. In the circuit shown in FIG. 1 NOR-gate logic is used, with the NOR gates performing coincidence (AND) functions and OR functions. These functions also could be obtained by using AND gates and OR gates in the circuit, or NAND gates could be employed if so desired.

The binary data to be converted is applied in parallel from a suitable source (not shown) to the first four stages of a five-stage shift register 10, but the number of stages of the shift register 10 may be varied to fit any particular application with which the system is to be used. In FIG. 1 the fifth stage is the output stage of the shift register 10 and is chosen to be the stage on the right end, with information being shifted through the shift register 10 from left to right. Binary information stored in the fifth or output stage of the shift register 10 may be in either of two forms or conditions "mark" (1) or "space" (0); and if a mark is stored in the output stage of the shift register, an output lead 11 has a "high" output and an output lead 12 has a "low" output. If a space is present in the final or output stage of the shift register 10, the output lead 12 is high and the lead 11 is low. The lead 11 is connected as one of two inputs to a NOR-gate 14 and the lead 12 is connected as one of three inputs to a NOR-gate 15, and whenever the leads 11 or 12 are "low" the corresponding NOR-gate 14 or 15 is enabled. Conversely, whenever the leads 11 or 12 are "high" the corresponding NOR-gates 14 and 15 are disabled and provide a low output irrespective of the condition of the other inputs to the NOR gates. The terms "high" and "low" are used to designate the two levels of signals possible in the system, with the actual signal levels being positive and negative, positive and ground, or the like.

The other inputs to the NOR-gates 14 and 15 are obtained from selected outputs of a seven-stage binary counter 17, with the input to the NOR-gate 14 being obtained from the seventh or last stage of the binary counter 17, corresponding to the attainment of a count 64 in the binary counter. Whenever the binary count of 64 is reached by the binary counter, the output from the last stage of the counter 17 applied to the NOR gate 14 goes low. At all other times this output is high. Similarly, the two inputs to the NOR-gate 15 correspond to binary counts of 8 and 16, respectively, and when both of these inputs are low the NOR-gate 15 produces a high output, provided it is enabled by a low output on the lead 12. This condition of low outputs from the binary counter corresponding to 16 and 8 occurs when a binary count of 24 is reached by the binary counter.

Pulses for driving or stepping the binary counter 17 are obtained from a 100 kHz. clock pulse source 18, so that the two inputs to the NOR-gate 15 from the binary counter 17 both go low 0.24 ms. after initiation of operation of the counter 17 from a reset condition. Similarly, the input from the counter 17 to the NOR-gate 14 goes low 0.64 ms. after initiation of operation of the counter from a reset condition. Since the outputs of the NOR-gates 14 and 15 both are normally low due to the presence of one or more high inputs to these gates, these outputs supplied to a NOR-gate 20 normally cause the output of the NOR-gate 20 to be high. This output in turn is supplied to a single-input NOR-gate 21, which operates as an inverter. Thus, whenever either of the NOR-gates 14 or 15 is enabled at all of its inputs, causing the output thereof to go high, the output of the NOR-gate 20 becomes low, which in turn causes the output of the single input NOR-gate 21 to go high. This low-to-high transition from the NOR-gate 21 is applied as a reset trigger pulse to reset flip-flop 23 resetting the flip-flop 23 producing a high-to-low transition as a shift pulse on a lead 25. This shift pulse is applied to the shift register 10 to shift the next data bit into position in the last stage of the shift register 10. At the same time, a low-to-high transition appears on a lead 27 extending from the other output of the flip-flop 23 to reset the counter 17 to zero. The next clock pulse from the 100 kHz. clock 18 is applied to the set input of the flip-flop 23 causing it to be set to its initial condition; and the counter 17 resumes counting from 0, with either the NOR-gate 14 or the NOR-gate 15 next causing the cycle of operation to be repeated, depending upon whether or not a mark or space data bit is stored in the last stage of the shift register 10.

Thus it can be seen that the rate at which data is shifted through the shift register 10 is dependent upon whether or not the data is mark or space data, with the shift pulses occurring at a higher frequency rate (2,080 Hz. for a continuous sequence of mark data bits and at a lower frequency rate (780 Hz.) for a continuous sequence of space data bits.

When either of the outputs of the shift register 10 as applied to the leads 11 and 12 goes high, one or the other of the inputs to a NOR-gate 29 also goes high, causing the output of the NOR-gate 29 to change from a normally high condition to a low condition. This in turn causes a high output to be obtained from a single input NOR gate inverter 30, with the low-to-high transition from the inverter 30 being indicative of the presence of data appearing in the output stage of the shift register 10. This is the "initiate operation" condition of the system with the output of the NOR-gate 30 being illustrated in curve A of FIG. 2. The low-to-high pulse transition obtained from the output of the NOR-gate 30 is differentiated by a differentiating circuit consisting of a capacitor 31 and a resistor 32, causing a low-to-high trigger pulse to be applied to the set input of an output control NOR gate flip-flop 34. This results in a low going output from the flip-flop 34 which is applied to the input of an output NOR-gate 35 to enable the output gate 35. In order to cause this condition of operation to be maintained throughout the presentation of data from the output stage of the shift register 10, the high output of the NOR-gate 30 also is applied as one input to a control NOR-gate 36 causing the output of the NOR-gate 36 to remain low so long as the output of the NOR-gate 30 is high. This low output from the NOR-gate 36 is applied to the reset input of the NOR gate output flip-flop 34, causing the internal cross-coupled input to the set input of the NOR gate flip-flop 34 to be high, thereby maintaining the low output from the output control flip-flop 34.

In order to insure that the output of the NOR-gate 35 for the first converted output pulse always has a particular phase (in the present example, the first output pulse is chosen to be "-high"), the output pulse from a NOR-gate inverter 38 provides a momentary high-to-low pulse transition resulting from the differentiated low-to-high pulse transition applied to its input from the differentiator circuit 31, 32. This high-to-low pulse at the output of the NOR-gate 38 appears only when data first appears at one of the outputs of the output stage of the shift register 10. At all other times the output of the NOR-gate 38 is a high output.

When the output of the NOR-gate 38 becomes low, an initial phase determining NOR-gate 40 is enabled; and if the normal output (N) of a complementary output flip-flop 42 applied to the other input of the NOR-gate 35 is low at this time, the output of the NOR-gate 35 is high, which is the desired condition for the initial phase of the output terminal train. Whenever the output of the flip-flop 42 applied to the NOR-gate 35 initially is low, the other output (I) of the flip-flop 42, which is applied as the second input to the NOR-gate 40, is a high output, causing the NOR-gate 40 to be nonresponsive to the pulse from the NOR-gate 38 and forcing the output of the NOR-gate 40 to be low. This output constitutes one of the three inputs to a width control NOR-gate 43, the other two inputs of which are low at this time, resulting in a high output therefrom which is inverted by the single-input NOR-gate 44 to continue to present a low input to the complementary flip-flop 42. As a result, no change in the input to the trigger of the flip-flop 42 takes place at this time. The output of the NOR-gate 38 then reverts to a high output during the remainder of the transmission, since the negative or low output is obtained only when the output of the NOR-gate 30 initially goes high. Thus, during the remainder of the transmission the output of the NOR-gate 40 is held low, enabling the NOR-gate 43.

If at the time the low going differentiated pulse passed by the NOR-gate 38 arrives at the input of the NOR-gate 40, the outputs flip-flop 42 are in the opposite conductive states, causing the input to the NOR-gate 35 to be high, resulting in a low output therefrom, and causing the other input (I) to the NOR-gate 40 to be low, the differentiated low pulse applied to the NOR-gate 40 from the NOR-gate 38 results in a low-to-high going momentary pulse at the input of NOR-gate 43. As a result, the output of the NOR-gate 43 momentarily goes low, which results in a momentarily high output from the NOR-gate inverter 44. Upon termination of this momentary high output from the NOR-gate 44 the high-to-low transition operates as a trigger pulse to the flip-flop 42, causing it to change state almost immediately following the presentation of data from the output stage of the shift register 10. When this occurs, the output of the output NOR-gate 35 is high; so that the initial phase or output condition of the signal obtained from the NOR-gate 35 always is high.

As stated in the foregoing description of the operation of the flip-flop 42 for the initial start-up of the circuit, high-to-low trigger pulse transitions cause the flip-flop 42 to change state. Initially the output of the NOR-gate 43, with the exception described above, is a high output, with the output of the NOR-gate 44 being a steady low signal. If a space data bit in the shift register is the first data bit being converted by the system (as shown in waveform B of FIG. 2) the mark output on lead 11 is low and the space output on lead 12 is high, as described previously. A low output on the mark lead 11 enables the NOR-gate 14; and when the seven-stage binary counter reaches a count of 64, the NOR-gate 14 produces a high output. This output is applied to the middle input of the NOR-gate 43, causing its output to become low, resulting in a high output from the NOR-gate 44. As soon as the seven-stage binary counter 17 is reset by the operation of the flip-flop 23, as described previously, the output of the NOR-gate 14 once again becomes low, causing the output of the NOR-gate 43 to become high, with the output of the NOR-gate 44 in turn then being the desired high-to-low transition trigger pulse for changing the state of the flip-flop 42. The length of time from the point where an output signal first was obtained from the NOR-gate 35 by the operation of the output gate flip-flop 34 until this change of stage caused by the trigger pulse applied to the flip-flop 42 is that required for 64 clock pulses to be counted by the seven-stage binary counter. Thus the first output pulse, applied to the transmitter 47 is a half-cycle square wave signal of 0.64 ms. duration (see waveform D of FIG. 2).

Now assume that a mark is to be translated next by the system. When this occurs the mark output lead 11 is high (waveform B of FIG. 2), thereby disabling the NOR-gate 14, causing it output to remain low; and the space output lead 12 is low thereby enabling the NOR-gate 15. This low output appearing on the lead 12 also is applied as one input to a further NOR-gate 48, the other input to which is obtained from the output of the binary counter corresponding to an output count of 16. Since the outputs of the binary counter are high until the count corresponding to the particular output is reached, the NOR-gate 48 normally has a low output. When a count of 16 is reached by the counter 17, the NOR-gate 48 output goes high thereby causing the output of the NOR-gate 43 to go low and the output of the NOR-gate 44 to go high, preparing the flip-flop 42 for receipt of the next trigger pulse. The "16" output of the binary counter 17 remains low as the binary counter continues to count pulses obtained from the output of the clock 18; and when a count of 24 is reached, both the "16" output and the output for the stage corresponding to a count of "8" go low, causing the output of the NOR-gate 15 to reset the counter and the shift register 10 as previously described. When the counter is reset, the output of the stage corresponding to a count of 16 once again goes high, causing the output of the NOR-gate 48 to go low, which in turn results in a low going trigger pulse from the NOR-gate 44 to change the state of the complementary output flip-flop 42. The time required for this to occur from the time the flip-flop 42 last was set to change states is 0.24 ms., the length of time required for the counter to count 24 output pulses from the clock 18.

Figure 2:
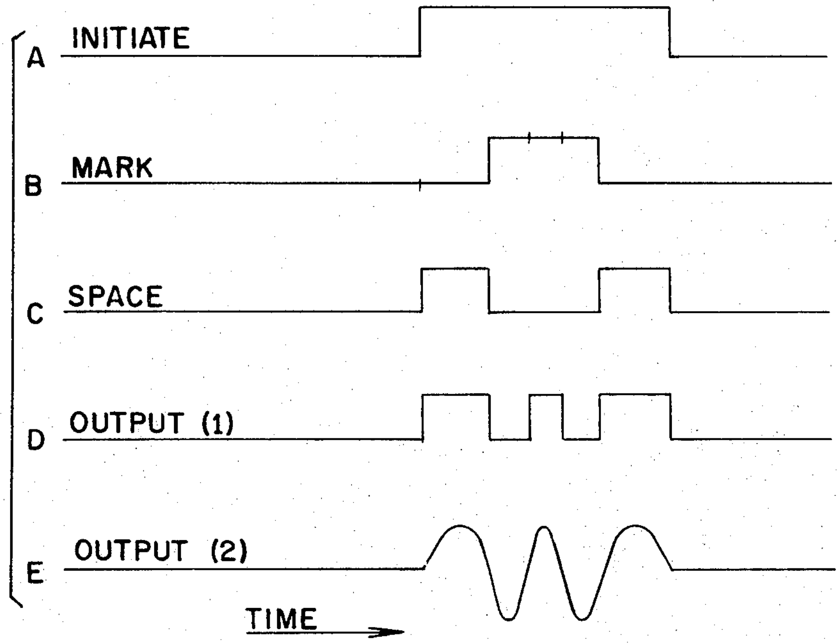
FIGS. 2 and 3 illustrate waveforms useful in explaining the operation of the system shown in FIG. 1.

Thus, the output of the NOR-gate 35 is a sequence of half-cycle square wave pulses of two different frequencies (2,080 Hz. for mark and 780 Hz. for space) as shown in waveform D of FIG. 2, with the length of each half-cycle being determined by which of the NOR-gates 14 or 15 is enabled each time the counter 17 starts a new count cycle. The bit rate obtained from the output of the NOR-gate 35 can be as high as 4,160 bits per second for all mark transmission or as low as 1,560 bits per second for all space transmission, with an average bit rate being observed of approximately 2,270 bits per second.

The output of the NOR-gate 35 may be applied through suitable filtering means to cause it to be modified into a sine wave configuration if this is necessary. This square wave output, however, also may be used directly to modulate a voice-band transmitter with no separate digital to analog conversion. The transmission system then causes the output to appear as shown in curve E of FIG. 2 in the form of a series of alternate phase half-cycle sine waves of the two different frequencies utilized to determine the respective lengths of the mark and space pulses obtained from the output of the conversion system.

Figure 3:
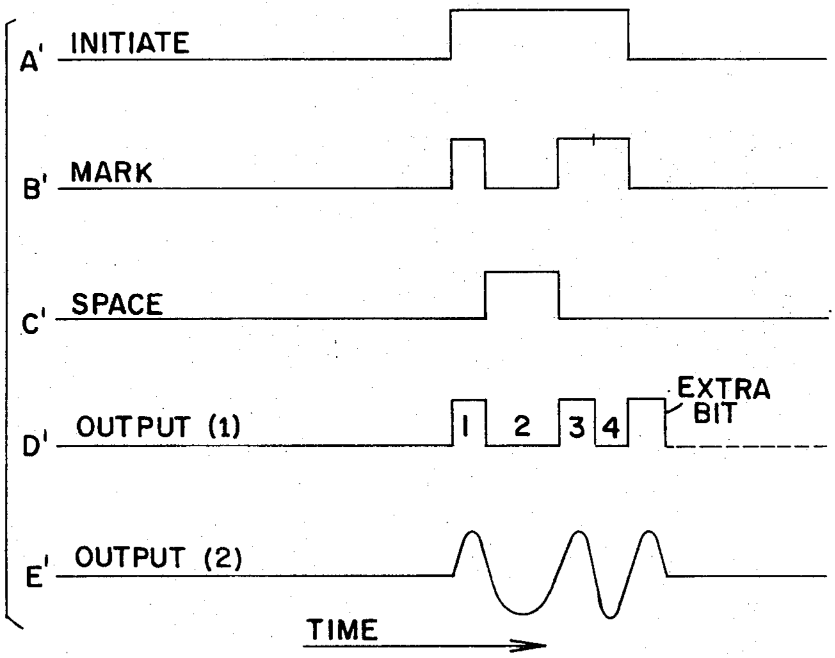

Due to the fact that the operation of the input phasing of the system is such that the first data bit is obtained at the output of the NOR-gate 35 in the form of a high half-cycle pulse, it is possible that the last bit of data being converted could be lost whenever the transmission includes an even number of bits. FIG. 3 illustrates this problem for a sequence including a mark, space, mark-mark group of data bits being translated. Referring to wave form D′, which is the output of the NOR-gate 35, it may be seen that the first mark obtained from waveform B′, is a high half-cycle pulse; and that the next space pulse as shown in waveform C′ is low half-cycle pulse of a lower frequency. The third and fourth mark pulses are in the form of a high half-cycle and a low half-cycle, respectively. If the output then terminates and remains in this state, the final pulse is ambiguous since it can not be ascertained whether or not this pulse is a mark or a space pulse since there would be no transition indicating the end of this pulse.

For this reason the system always sends an odd number of bits, that is, if the input data stream consists of an even number of bits, one mark is added to the end of the data stream. This extra bit may be used as a timing or concluding bit and also provides the necessary transition in order to ascertain the pulse duration which is needed to determine whether or not the last data bit is a mark or space.

Referring now to FIG. 2, if an odd number of data bits are present in the train or sequence of binary data bits converted by the system, the output of the complementary flip-flop 42 applied to the input of the NOR-gate 35 is low at the end of the sequence, resulting in a high output from the NOR-gate 35, which may be observed as the third high-output pulse shown in curve D of FIG. 2. Upon termination of the availability of data from the shift register 10, the shift register is arranged so that both outputs, mark and space, appearing on leads 11 and 12, go low. When this occurs, both inputs to the NOR-gate 29 are low, resulting in a low output from the NOR-gate 30 thereby enabling the NOR-gate 36. Since the output of the flip-flop 42 also is low during the half-cycle time interval just prior to this time, the trigger pulse obtained from the output of the NOR-gate 44 at the time that the shift register 10 is cleared and the counter 17 is reset, causes the flip-flop 42 to be set to a condition where its output, as applied to the NOR-gate 35, goes high. This in turn causes the final high-to-low transition from the output of the NOR-gate 35 as observed in waveform D of FIG. 2.

The final low-to-high transition obtained from the output (N) of the flip-flop 42, is differentiated by a differentiating circuit consisting of a capacitor 50 and a resistor 51, and is applied to the input of a single input NOR-gate invertor 49 which provides a momentary low pulse at its output. This pulse now is passed by the enabled NOR-gate 36 which provides a low-to-high reset trigger pulse transition at its output to reset the output gate control flip-flop 34, causing the output from the flip-flop 34 and applied to the NOR-gate 35 to rise to a positive value, thereby maintaining the output of the NOR-gate 35 at a low value.

Now assume that the converted train of data bits included an even number of data bits. When this occurs, the output of the NOR-gate 35 for the final converted data bit is low as indicated by bit 4 in curve D′ of FIG. 3. This means that the output of the complimentary flip-flop 42 applied to the input of the NOR-gate 35 is high during the time interval of the fourth converted pulse. When the data is cleared from the shift register 10, and the counter 17 is reset, as described previously, the state of the flip-flop 42 is changed so that its output goes low, causing a low-to-high transition at the output of the NOR-gate 35, which then provides a termination or end of the fourth data bit as observed at the output of the NOR-gate 35.

It is necessary, however, to return the system to its neutral or off condition, with a low output being obtained from the NOR-gate 35. Since the complementary output (I) of the flip-flop 42 which is applied to the input of the NOR-gate 40 is high at this time, the output of the NOR-gate 40 is low enabling the NOR-gate 43. The seven-stage binary counter continues to be driven by the 100 kHz. clock 18 to count the output pulses from the clock circuit in the same manner as it is operated when data is present in the shift register 10. As a consequence, when the count of 16 is reached, the NOR-gate 48 is enabled to apply a high input to the NOR-gate 43, the other two inputs of which are low; so that the output of the NOR-gate 44 goes high.

Then when the count of 24 is reached, the binary counter 17 is reset, as described previously, and the output of the NOR-gate 48 once again becomes low, resulting in a high-to-low pulse transition from the output of the NOR-gate 44. This causes the flip-flop 42 to change state providing the extra bit shown in curve D′ of FIG. 3, with the extra bit being of a length corresponding to the length of a mark pulse in the transmitted output signal. In this manner it is insured that the last pulse is transmitted from the transmitter 47 and obtained from the NOR-gate 35 in a manner permitting its identification, so that the last data bit of a sequence having an even number of data bits in the converted train is not lost. At the time that the flip-flop 42 is reset to provide the termination of this extra bit, the NOR-gate 49 operates, as described previously, in conjunction with the NOR-gate 36 to reset the output gate flip-flop 34, thereby holding the output of the NOR-gate 35 at a low level, terminating the transmission of data from the system.

During the time that no information is present in the shift register 10, the seven-stage binary counter continues to recycle with outputs being obtained from the NOR-gate 15 in the same manner as would be obtained if mark data bits where present in the output stage of the shift register 10. This continual recycling of the system provides data sync pulses for the operation of the shift register, so that data will be applied properly to the output stage of the shift register whenever it appears on the input lines. During this time of no data in the output stage of the register 10, however, the output NOR-gate 35 is blocked, so that no data is being transmitted from the system.

It should be noted that the system has a variable bit rate and that the pulse width or duration of the mark and space pulses need not be harmonically related, although harmonic relationships between these pulses may be utilized if desired. The operation of the system is not limited to only two pulse widths. By adding different gating circuitry, several pulse widths may be accommodated for multiplexing applications or even for a return to zero FSK adaptability of the system. Due to the fact that half-cycles are provided for each digitalized information bit, extremely fast bit rates result even when the system is used for transmission of data in the audio pass band. An examination of the output curves E and E′, which are representative of the waveform of the transmitted data obtained from the output of the transmitter 47, it may be seen that the circuitry provides exactly one-half cycle of an audio tone for each data bit, even though the unit receives digitalized information and is entirely digitalized. No digital-to-analog conversion is required in the output of the unit when the system is used with radio or telephone line links.

I claim:

1. A system for converting a train of binary data bits into a sequence of pulses of at least two different widths, pulses of one width corresponding to data bits of one condition and pulses of another width corresponding to data bits of another condition, including in combination:

a source of data bits having first and second outputs with an enabling signal appearing on the first output for data bits of said one condition and an enabling signal appearing on the second output for data bits of said other condition;

first and second gating means enabled by enabling signals on the first and second outputs, respectively, of the source of data bits;

timing means having first and second outputs and operable for producing pulses thereon at first and second time intervals, respectively, following initiation of operation of the timing means, with the first output of the timing means being coupled with the first gating means and with the second output of the timing means being coupled with the second gating means, the first and second gating means each providing an output pulse whenever the corresponding gating means is enabled at the time of occurrence of a pulse on the respective output of the timing means;

means coupled with the first and second gating means and responsive to an output pulse from either of said gating means for causing the next data bit to be supplied to the outputs of the source of data bits; and means for providing an output signal, the phase of which reverses each time an output pulse is obtained form either of the gating means.

2. The combination according to claim 1 further including means for resetting the timing means each time an output pulse is obtained from either of the gating means.

3. A system for converting trains of binary data bits into a sequence of pulses of two different widths, pulses of one width corresponding to data bits of one binary condition and pulses of another width corresponding to data bits of another binary condition, including in combination:

a source of binary data bits having first and second outputs, with an enabling signal appearing on the first output for data bits of said one binary condition and an enabling signal appearing on the second output for data bits of said other binary condition;

first and second gating means enabled by enabling signals on the first and second outputs, respectively, of the source of binary data bits;

counter means having at least two outputs, corresponding to first and second counts, the output corresponding to the first count being coupled with the first gating means and the output corresponding to the second count being coupled with the second gating means, the first and second gating means each providing an output pulse whenever the corresponding gating means is enabled at the time of occurrence of the respective count reached by the counter means;

a source of clock pulses for driving the counter means; means coupled with the first and second gating means and responsive to an output pulse from either of said gating means for resetting the counter means and for causing the next data bit to be supplied to the outputs of the source of binary data bits; and means for providing an output signal, the phase of which reverses each time an output pulse is obtained from either of said gating means.

4. The combination according to claim 3 wherein the means for resetting the counter means and the means for providing the output signal comprise first and second bistable devices, respectively, with the second bistable device being a complementary bistable multivibrator, the state of which changes each time an output pulse is obtained from either of the first and second gating means.

5. The combination according to claim 3 further including means for establishing a predetermined phase of the output signal of the output of the means for providing said output signal for the first data bit being converted by the system.

6. The combination according to claim 3 further including means responsive to an even count of the data bits being converted for adding and converting to the train of data bits a data bit of a predetermined one of the binary conditions to cause the system to always convert an odd number of data bits.

7. The combination according to claim 3 wherein the source of binary data bits is a shift register, the output stage of which has said first and second outputs and wherein the counter means is a binary counter.

8. The combination according to claim 7 wherein the second count is higher than the first count and the first and second counts are sufficiently separated so that the time required to step the counter from its reset condition to the first count is substantially less than the time required to step the counter from its reset condition to the second count.

9. A system for converting digital waveforms comprising trains of binary input signals into a sequence of pulses of two different widths, the pulses of one width corresponding to input signals of one binary condition and pulses of the other width corresponding to input signals of another binary condition, the system including in combination:

a shift register supplied with binary input signals to be converted and having an output stage with first and second outputs, an enabling signal appearing on the first output with a binary signal of said one condition appearing in the output stage and an enabling signal appearing on the second output with a binary signal of said other condition appearing in the output stage;

first and second gating means enabled by enabling signals on the first and second outputs, respectively, of the output stage of the shift register;

a binary counter means having an output corresponding to a first binary count coupled with an input to the first gating means and having an output corresponding to a second binary count coupled with an input to the second gating means, each gating means providing an output pulse whenever the gating means is enabled at the time the corresponding respective count is reached by the binary counter;

a source of clock pulses for stepping the binary counter, said clock pulses being counted in the binary counter for producing the first and second counts therein;

a first bistable multivibrator responsive to the output pulses of the first and second gating means for resetting the counter whenever an output pulse is obtained from either of the gating means and for providing a shift pulse to the shift register to present the next binary signal to the output stage thereof; and a complementary bistable multivibrator responsive to the resetting of the counter for providing a train of output pulses, the phase of which reverses each time the counter is reset after reaching the first or second counts to trigger the complementary bistable multivibrator into a different state of operation.

10. The combination according to claim 9 further including means for initially setting the complementary bistable multivibrator to a predetermined output condition in response to the initial appearance of an enabling signal on either of said first and second outputs of the last stage of the shift register.

11. The combination according to claim 10 further including means responsive to the enabling signals on the first and second outputs of the last stage of the shift register and further responsive to a predetermined state of operation of the complementary bistable multivibrator for sensing a predetermined relationship between enabling signals and the state of operation of the complementary bistable multivibrator for changing the state of the complementary bistable multivibrator whenever such predetermined condition exists.

12. The combination according to claim 11 wherein the means for changing the state of the complementary multivibrator operates when no enabling signals are obtained from the output stage of the shift register and the state of operation of the complementary bistable multivibrator indicates an even number of binary input signals has been converted.

* * * * *